United States Patent [19]

Steffen et al.

[11] 4,371,709

[45] Feb. 1, 1983

[54] METHOD OF PREPARING OLIGOMERIC BROMINOUS XYLYLENE BISPHENOL ETHERS

[75] Inventors: Klaus-Dieter Steffen, Hennef; Manfred Thallmeier, Troisdorf-Eschmar, both of Fed. Rep. of Germany

[73] Assignee: Dynamit Nobel AG, Troisdorf, Fed. Rep. of Germany

[21] Appl. No.: 167,555

[22] Filed: Jul. 11, 1980

[30] Foreign Application Priority Data

Jul. 24, 1979 [DE] Fed. Rep. of Germany ....... 2929914

[51] Int. Cl.³ .................... C07C 148/00; C07C 41/16
[52] U.S. Cl. .................................. 568/33; 568/641; 568/643; 252/609
[58] Field of Search .................. 568/641, 33, 643

[56] References Cited

U.S. PATENT DOCUMENTS

| | | | |
|---|---|---|---|
| 3,205,198 | 9/1965 | Deanin et al. | 568/641 X |
| 3,810,867 | 5/1974 | Anderson | 568/641 X |
| 3,862,990 | 1/1975 | Newton et al. | 568/33 |
| 4,220,805 | 9/1980 | Carnahan | 568/641 X |

*Primary Examiner*—Bernard Helfin
*Attorney, Agent, or Firm*—Sprung, Horn, Kramer & Woods

[57] ABSTRACT

An improved process for the preparation of oligomeric bromine containing xylylene bisphenol ethers is described wherein xylylene dichlorides and/or dibromides are reacted with bisphenols at 85° to 160° C. in the presence of an alkaline compound or employing the bisphenol in the form of an alkali salt wherein the reaction is conducted employing a ketone as solvent.

15 Claims, No Drawings

METHOD OF PREPARING OLIGOMERIC BROMINOUS XYLYLENE BISPHENOL ETHERS

BACKGROUND OF THE INVENTION

1. Field of the Invention

This invention relates to oligomeric, brominous xylylene bisphenol ethers as well as a method of preparing same.

2. Cross Reference to Related Applications

This invention is related to an improvement in the field of brominous oligomeric ethers as described in copending application Ser. No. 087,359, filed Oct. 23, 1979 and now abandoned, the disclosure of which is hereby incorporated herein by reference. There disclosed are various ethers of the formula

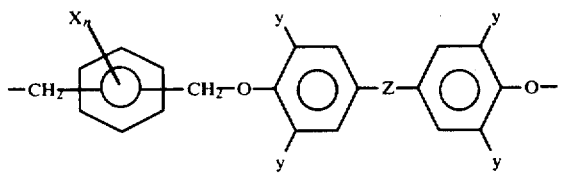

wherein each X is Br or Cl, $n=0$ to 4 and each Y is Br, Cl or H, at least two Br being contained in the sum of $X+Y$, and Z is a direct bond, $-CH_2-$, $-C(CH_3)_2-$ or $-SO_2-$. The ethers are useful as fire-retardants in plastics.

They are prepared by reacting the corresponding xylylene dichloride and bisphenol at 85° to 140° C., the bisphenol being employed as such together with an alkaline compound or as an alkali salt of the bisphenol.

DISCUSSION OF THE PRIOR ART

In such application, a description is given of the preparation of the compounds by means of solvents such as dioxane, methyl glycol or aromatic compounds having boiling points of 85° to 150° C. The dioxane used in the examples has a number of disadvantages: for example, the end product has to be precipitated with water, which can result in the formation of lumps and the clogging of the stirrer. Dioxane forms with water an azeotrope containing up to 17.6 percent water, which presents problems in recycling of the solvent. The danger of the formation of peroxide exists, which can concentrate especially in the distillation bottoms.

Methyl glycol can enter into the reaction with its free hydroxyl group, and therefore it is even less suitable.

The problem thereof existed of improving the method of preparation, especially through the use of appropriate solvents.

SUMMARY OF THE INVENTION

The subject of the invention is a method of preparing oligomeric, brominous xylylene bisphenol ethers containing structural units of the formula:

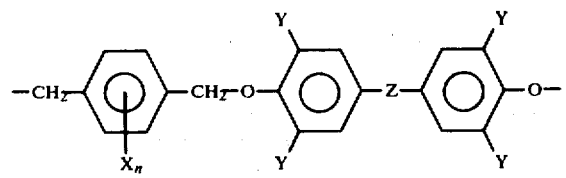

wherein $X=Br$, Cl or H, $n=0$ to 4 and Y is either Br, Cl or H, at least two bromines being contained in the sum of $X+Y$, and Z representing an alkylene moiety, especially $-CH(CH^3)_2$, $-CH_2-$ or $-SO_2-$, by the reaction of xylylene dichlorides and/or dibromides with bisphenols in the presence of alkaline compounds or as alkali salt at 85° to 160° C., and, if desired, the addition of terminal group closing monophenols or monohalogen alkyl compounds, which is characterized in that ketones are used as solvents. The moiety Z can be an alkylene moiety of 1 to 6 carbon atoms in the chain. Bisphenol reactants contemplated include in particular:
2,2-Bis-(4-hydroxy-3,5-dibromphenyl)-propane, -butane,
2,2-Bis-(4-hydroxy-3,5-dibromphenyl)-methane,
2,2-Bis-(4-hydroxy-3,5-dibromphenyl)-sulfone,
1,1-Bis-(4-hydroxy-3,5-dibromphenyl)-cyclohexane,
1,1-Bis-(4-hydroxy-3,5-dibromphenyl)-2,2,2-trichloroethane.

Suitable ketones are aliphatic and cyclic ketones of 3 to 10 carbon atoms. Examples of such ketones are: acetone, methyl ethyl ketone, methyl isopropyl, methyl isobutyl, methyl tert.-butyl, diisobutyl, and di-tert.-butyl ketone, 2-pentanone, 3-pentanone, 2-hexanone, 3-hexanone, heptanone, cycloheptanone, cyclohexanone, acetophenone, isophorone, but preferably 2-butanone, methyl isobutyl ketone or cyclohexanone, of which 2-butanone is greatly preferred.

2,2-bis-(4-hydroxy-3,5-dibromophenyl)-propane is also known as tetrabromodiane. Diane is 2,2-bis-(4-hydroxyphenyl)-propane also known as bis-phenol A.

These ketone solvents form with $H_2O$ azeotropes which, however, separate again upon condensation into a solvent-poor $H_2O$ phase and an $H_2O$-poor ketone phase, which with its low $H_2O$ content can easily be reused for additional reactions. On account of this limited miscibility with $H_2O$, these ketones offer an additional advantage.

The NaBr or NaCl that develops in the condensation brings about a separation of ketone and water into two separate phases at lower concentrations that in the case of pure solvents (salting-out effect). Thus in the case of 2-butanone, an aqueous, saturated NaCl phase (approximately 20% NaCl) or NaBr phase (approximately 50% NaBr) separates, which contains only 2 to 3% of butanone, although in the salt-free $H_2P$-butanone system 26.3% of butanone is soluble in $H_2O$ at 22° C. In the butanone mother liquor 2 to 6% of $H_2O$ is dissolved, although in the salt-free system 87.4% of $H_2O$ is soluble at 23° C. In this manner a large part of the salt and of the water is purged out in a simple manner. The butanone mother liquor can be used directly for additional reactions or can be distilled.

It is also advantageous in the butanone solvent system that the end product precipitates in easily filtrable form and does not have to be precipitated with water. On account of the poorer solubility of the oligomeric ethers in most of the ketone solvents, the drying of these products is usually also facilitated.

The amount of the solvent is to be selected such that 1 to 2 kilograms, preferable 1.2 to 1.4 kilograms, of solvent is used for each mole of halogenxylylene dichloride or dibromide.

When the boiling points of the ketones used are below the reaction temperature, a pressure of 1 to 10 bars is used.

The reaction is performed at temperatures of 80° to 180° C., preferably 120° to 160° C.

It has been found that no until the temperature is above about 120° C. is the end product dissolved by the solvent to such an extent that it becomes a viscous fluid phase which can be thoroughly stirred. The stirrer is advantageously a wall-riding anchor or band stirrer.

The process is especially suitable for the oligomeric brominous xylylene glycol bisphenol ethers which bear as terminal groups aryloxy moieties formed from phenols, especially brominated aryloxy moieties. These ethers have the formula:

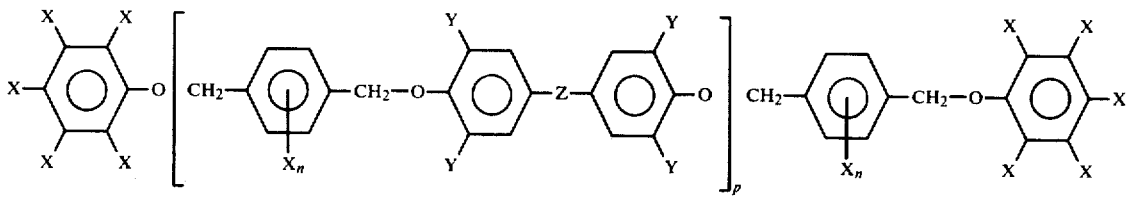

wherein X, Y, Z and n have the above-given meaning and p amounts to 2 to 10.

Phenols forming suitable terminal groups are especially tribromophenol, in some cases also pentabromophenol and the corresponding chlorophenols.

The bromine content of these ethers is to be not less than 40 weight percent, bromine contents above 60 weight percent being preferred.

The preparation of the oligomeric, brominous xylylene bisphenol ethers is accomplished in a conventional manner by dissolving the halogenated bisphenol with a stoichiometric to slightly less than stoichiometric amount of alkali hydroxide (as aqueous solution) in the ketone solvent, bringing the solution to reaction in the autoclave for 1 to 4 hours with a more than stoichiometric amount of halogen xylylene dihalide, then adding the necessary amount of a halogen monophenol alkali salt to close the terminal group, and letting the reaction complete itself for another 1 to 4 hours.

The products can be prepared in good yields of 90 to 98 percent of the theory. They are distinguished by a higher degree of crystallization than the products prepared in dioxane, and therefore they also have slightly higher softening points than the later.

These brominous oligomeric ethers are valuable flamebroofing agents for all homopolymers and copolymers, as described in Ser. No. 087,359, supra.

EXAMPLES

EXAMPLE 1

500 ml of 2-butanone (methyl ethyl ketone), 136 g of tetrabromodiane (0.25 mol), the 19.5 g of NaOH (0.49 mol) dissolved in 30 ml of $H_2O$, and 181.3 g of tetrabromo-p-xylylene dibromide (0.313 mol) are charged into a 1.5-liter jacketed glass autoclave, which is connected to an oil thermostat and provided with a wall-riding anchor stirrer, an internal thermometer, a pressure gauge and an injection cartridge. The autoclave is closed, and the mixture is heated with stirring for 1.5 hours at 130° C. (internal pressure: 4 to 5 bar).

Then the solutions of 30 g of tribromophenol, (0.09 mol) in 30 ml of butanone, and 5.5 g NaOH (0.138 mol) in 10 ml of $H_2O$, are loaded into the injection cartridge and forced into the autoclave with a nitrogen gas pressure of about 6 bar. A slight temperature rise of about 8° C. takes place.

Stirring is continued for one more hour at 130° C., the mixture is cooled, the granular product is filtered out, and washed free of bromide once with butanone and then with $H_2O$. It is then dried in the water-jet vacuum at about 110° C.

After the solid has been filtered out, the mother liquor is separated into a large, upper butanone phase and a small, lower aqueous phase saturated with NaBr.

| Yield: | 272 g (91.6% of the theory) |
|---|---|
| Softening point: | 240–250° C. |
| Br | 67.7% |
| Na | less than 0.01% |
| OH Number | 5 |

EXAMPLE 2

In a glass autoclave (see Example 1), 136 g of tetrabromodiane (0.25 mol) is dissolved in 500 ml of butanone and neutralized with 19.5 g of NaOH (0.49 mol) dissolved in about 20 ml of $H_2O$.

After about 2 minutes, turbidity occurs and a rise in temperature of about 12° C. After the addition of 153.5 g of tetrabromo-p-xylylene dichloride (0.313 mole, prepared by chlorinating tetrabromoxylene), the autoclave is closed and heated up to 130° C. (45 bar).

The precipitate, caked together at about 115° C., is in a molten state beginning at about 125° C. After two hours, 5.5 g of NaOH (0.138 mol) dissolved in 10 ml of $H_2O$, and 30 g of tribromophenol (0.09 mol) dissolved in 30 ml of butanone, are formed into the autoclave by means of the injection cartridge, and stirring is continued for another three hours at 130° C.

After cooling, the precipitate is filtered out, and washed free of chloride once with butanone and then with water. It is dried at 120° C. and 14 Torr.

| Yield | 269 g (90.6% of the theory) |
|---|---|
| Softening range | 204–211° C. |
| Br | 60.4% |
| Cl | 5.1% |
| Na | less than 0.01% |

The product has an average molecular weight (determined by gas chromatography) of 3000 to 5000.

EXAMPLE 3

500 ml of acetone, a solution of 19.5 g of NaOH in 30 ml of $H_2O$, 136 g of tetrabromodiane (0.25 mol) and 153.5 g of tetrabromo p-xylylene dichloride (0.313 mol) are added successively to the autoclave described in Example 1. After the autoclave is closed, it is heated for 3 hours at 125° C. with stirring. Then the solutions of 30 g of tribromophenol in 30 ml of acetone and 6 g of NaOH in 12 ml $H_2O$ are forced into the autoclave through the injection cartridge (temperature rises briefly to 132° C.) and the reaction is allowed to continue for 2.5 hours at 125° C.

After cooling, the somewhat lumpy precipitate is crushed, stirred up in acetone, filtered, and washed free of chloride with water. The end product is dried at 120° C. and 14 Torr.

| Yield | 264 g (88.9% of the theory) |
|---|---|
| Softening point | 207-217° C. |
| $\eta_{sp}/C$ | 0.05 (1% in o-dichlorbenzene) |
| Br | 62.6% |
| Cl | 4.2% |
| Na | less than 0.01% |

The collected acetone and water filtrates were acidified with HCl, and the precipitate was filtered out and dried. It consisted mainly of the input bromophenols. At a reaction temperature of 125° C. (Example 3), 4 g of unreacted phenols were filtered out; at 110° C., and 10 g, and at 100° C., 18 g.

EXAMPLE 4

500 ml of cyclohexanone, 136 g of tetrabromodiane (0.25 mol), a solution of 19.5 g of NaOH in 20 ml of water and 181.1 g of tetrabromo-p-xylylene dibromide (0.313 mol) were placed in a multi-necked flask provided with stirrer, internal thermometer, a fractionating column and a water separator, and heated with stirring. At approximately 97° C. (top temperature, azeotropic boiling point) refluxing began. 42 ml of a mixture of water and cyclohexanone were separated until the bottom temperature rose to 130° C. After three hours the solutions of 30 g of tribromophenol (0.09 mol) in 30 ml of cyclohexanone and 6 g of NaOH in 12 ml of water were added. Then stirring was continued for 2.5 hours at 130° C. An additional 10 ml of water being separated.

The solution was cooled to 20° C. and precipitated with 2 liters of a mixture (1:1) of water and acetone. The precipitate was filtered out, washed bromine-free with water, and dried at 100° C. and 14 Torr.

| Yield | 285 g (96.0% of the theory) |
|---|---|
| Softening range | 190-200° C. |
| Br | 64.1% |
| Na | less than 0.01% |

EXAMPLE 5

In the glass apparatus described in Example 4, 500 ml of cyclohexanone, 136 g of tetrabromodiane (0.25 mol), 19.5 g of NaOH (0.49 mol) in 20 ml of water and 153.5 g of tetrabromo-p-xylylene dichloride (0.313 mol, prepared from tetrabromoxylene by chlorination) were reacted. The cyclohexanone-water azeotrope boiled at 98° C. Approximately 30 ml of a mixture of water and cyclohexanone were separated in 3 hours so that the internal temperature rose to 130° C. Then 30 g of tribromophenol dissolved in 30 ml of cyclohexanone and 6 g of NaOH dissolved in 12 ml of water were added, and again 18 ml of water was separated.

After 2.5 hours of reaction at 130° C., the mixture was cooled and precipitated with 2 liters of a 1:1 mixture of acetone and water, and the solid was filtered out and washed free of chloride with acetone and then with water, and dried at 100° C. and 14 Torr.

| Yield | 280 g (94.3% of the theory) |
|---|---|
| Softening point | 192-196° C. |
| Br | 58.7% |

| Cl | 4.9% |
|---|---|
| Na | less than 0.01% |

EXAMPLE 6

In a glass autoclave as described in Example 1, 750 ml of methyl isobutyl ketone (4-methyl-2-pentanone), 136 g of tetrabromodiane (0.25 mol), a solution of 19.5 g of NaOH (0.49 mol) in 20 ml of water and 181.1 g of tetrabromo-p-xylylene dibromide (0.313 mol) were placed and the closed autoclave was heated for 3 hours at 140° C. (3-4 bar). Then 30 g of tribromophenol dissolved in 30 ml of methyl isobutyl ketone and 6.0 g of NaOH dissolved in 12 ml of water, were forced into the autoclave by means of the injection cartridge. Stirring was continued for another 3 hours at 140° C., and then the mixture was cooled, the precipitate was filtered out and washed once with methylisobutylketone, and then with water until free of bromide, and dried. Again an NaBr-saturated aqueous phase separated in the mother liquor filtrate.

| Yield | 291 g (98% of the theory) |
|---|---|
| Softening range | 230-243° C. |
| Br | 66.6% |
| Na | 0.1% |

EXAMPLE 7

Example 2 is repeated, but instead of 500 ml of pure butanone, 500 ml of butanone mother liquor containing 2.7% of water was used.

| Yield | 273 g (92.0% of the theory) |
|---|---|
| Softening range | 204-210° C. |
| Br | 60.4% |
| Cl | 5.1% |
| Sodium | Less than 0.01% |

What is claimed is:

1. In a method of preparing an oligomeric-bromine-containing xylylene phenol ether, containing structural units of the formula

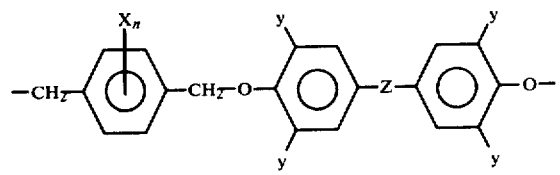

wherein

X-Br, Cl or H, n=1 to 4 and y is Br, Cl or H, independently of one another, at least two bromines being contained in the sum X+Y, and Z representing a direct bond, an alkylene moiety of 1-6 carbon atoms in the chain, or a —SO$_2$— group by contacting a p-xylylene dichloride and/or dibromide with a phenol, bisphenol or bis (hydroxyphenyl) sulphone in the presence of an alkaline compound in the form of an alkali metal salt at 85° to 160° C., the improvement wherein the process is carried out in the presence of a ketone solvent, said ketone being an aliphatic or cyclic ketone of 3 to 10 carbon atoms.

2. A method of claim 1, wherein the pressure amounts to 1 to 10 bar.

3. A method of claim 1, wherein the temperature amounts to 80° to 180° C.

4. A method of claim 1, wherein 2-butanone, methyl isobutyl ketone or cyclohexanone is used as solvent.

5. A method of claim 1, wherein the process is carried out in the presence of a monophenol or monohalogen alkyl compound whereby to close the terminal group of the oligomer so formed.

6. A method of claim 5, wherein a monophenol is employed and that monophenol is a tribromphenol, a pentabromophenol, a pentachlorophenol or a trichlorophenol.

7. A method according to claim 1, wherein the ketone is present in a amount of 1 to 2 kilograms for each mole of xylylene dichloride or dibromide.

8. A method according to claim 1 wherein said ketone is selected from a group consisting of acetone, methyl ethyl ketone, methyl isopropyl ketone, methyl isobutyl ketone, methyl tert.-butyl ketone, diisobutyl ketone, di-tert.-butyl ketone, 2-pentanone, 3-pentanone, 2-hexanone, 3-hexanone, heptanone, cycloheptanone, cyclohexanone, acetophenone, and isophorone.

9. A process according to claim 1 wherein said ketone is selected from the group consisting of 2-butanone, methyl isobutyl ketone and cyclohexanone.

10. A process according to claim 1 wherein said ketone is 2-butanone.

11. A process according to claim 1 wherein Z is a direct bond.

12. A process according to claim 1, wherein Z is an alkylene group of 1-6 carbon atoms.

13. A process according to claim 1, wherein Z is a —CH$_2$—, —C(CH3)$_2$— or —SO$_2$— group.

14. A process according to claim 1, wherein Z is a —SO$_2$— group.

15. In a method of preparing an oligomeric bromine-containing phenol, ether, containing a structural unit of the formula

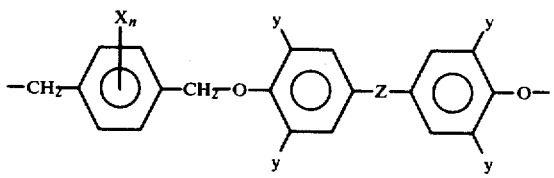

wherein

X-Br, Cl or H, n=1 to 4, each y is Br and Z is cyclohexylene by contacting a p-xylylene dichloride and/or dibromide with a 1,1 bis (4-hydroxy-3,5-dibromophenyl)cyclohexane in the presence of an alkaline compound in the form of an alkali metal salt at 85° to 160° C., the improvement wherein the process is carried out in the presence of an aliphatic or cyclic ketone of 3 to 10 carbon atoms as solvent.

* * * * *